US008405605B2

(12) United States Patent
Sugahara

(10) Patent No.: US 8,405,605 B2
(45) Date of Patent: Mar. 26, 2013

(54) ELECTRONIC APPARATUS

(75) Inventor: Hiroto Sugahara, Aichi-ken (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 384 days.

(21) Appl. No.: 12/727,808

(22) Filed: Mar. 19, 2010

(65) Prior Publication Data

US 2010/0247133 A1 Sep. 30, 2010

(30) Foreign Application Priority Data

Mar. 25, 2009 (JP) ................................ 2009-074536

(51) Int. Cl.
*G06F 3/02* (2006.01)
*G09G 5/00* (2006.01)

(52) U.S. Cl. ............................ 345/156; 399/81; 399/88

(58) Field of Classification Search ............ 345/55-111, 345/169; 399/81, 88
See application file for complete search history.

(56) References Cited

U.S. PATENT DOCUMENTS

| | | | | |
|---|---|---|---|---|
| 2003/0227441 | A1 | 12/2003 | Hioki et al. | |
| 2005/0151782 | A1 | 7/2005 | Ishida et al. | |
| 2007/0085845 | A1 | 4/2007 | Kikuchi et al. | |
| 2008/0212271 | A1* | 9/2008 | Misawa | 361/681 |
| 2009/0085866 | A1 | 4/2009 | Sugahara | |

FOREIGN PATENT DOCUMENTS

| | | |
|---|---|---|
| JP | S62-40877 | 3/1987 |
| JP | 2000-207969 | 7/2000 |
| JP | 2002/189450 | 7/2002 |
| JP | 2002/278515 | 9/2002 |
| JP | 2003/051921 | 2/2003 |
| JP | 2003-337551 | 11/2003 |
| JP | 2004/46792 | 2/2004 |
| JP | 2005/346236 | 12/2005 |
| JP | 2006-035662 | 2/2006 |
| JP | 2007/108441 | 4/2007 |
| JP | 2009-086403 | 4/2009 |

OTHER PUBLICATIONS

Decision for Grant a Patent for Japanese Application No. 2009-074536 dated Mar. 27, 2012.

* cited by examiner

*Primary Examiner* — Michael Pervan
(74) *Attorney, Agent, or Firm* — Frommer Lawrence & Haug LLP

(57) ABSTRACT

There is provided an electronic apparatus including: an input mechanism including a sheet-shaped base material having flexibility and a bending detector which detects an elastic bending deformation of the base material; a power supply device; a bending deformation judging mechanism judging whether or not a first bending deformation mode is generated in the base material; a controller; and a mode changing mechanism changing an operation mode of the electronic apparatus from a normal mode to a low power mode in which the electronic apparatus is operated in a power lower than the normal mode, when the first bending deformation mode is generated in the base material.

18 Claims, 11 Drawing Sheets

Fig. 6

| DEFORMATION MODE | USER'S OPERATION | OUTPUT VOLTAGE OF BENDING DETECTING SENSOR | | | | | PROCESSING CONTENTS |
|---|---|---|---|---|---|---|---|
| | | FIRST | SECOND | THIRD | FOURTH | FIFTH | |
| (a) | BENDING TO BE CONVEX UPWARD ON THE WHOLE | − | − | − | GND | GND | ENLARGEMENT OF IMAGE |
| (b) | BENDING TO BE CONVEX DOWNWARD ON THE WHOLE | + | + | + | GND | GND | REDUCTION OF IMAGE |
| (c) | BENDING UPWARD OF UPPER RIGHT CORNER PORTION | GND | GND | GND | + | GND | SWITCHING TO IMAGE OF IMMEDIATELY AFTER DATA |
| (d) | BENDING DOWNWARD OF UPPER RIGHT CORNER PORTION | GND | GND | GND | − | GND | SWITCHING TO IMAGE OF IMMEDIATELY BEFORE DATA |
| (e) | BENDING UPWARD OF UPPER LEFT CORNER PORTION | GND | GND | GND | GND | + | START OF PRINTING OF DISPLAYED IMAGE |
| (f) | BENDING DOWNWARD OF UPPER LEFT CORNER PORTION | GND | GND | GND | GND | − | CANCELLATION OF PRINTING OF DISPLAYED IMAGE |
| (g) | FOLDED IN TWO | + | GND | GND | GND | GND | POWER SUPPLY OFF |

ELECTRONIC APPARATUS

CROSS REFERENCE TO RELATED APPLICATION

The present application claims priority from Japanese Patent Application No. 2009-074536 filed on Mar. 25, 2009, the disclosures of which are incorporated herein by reference in their entirety.

BACKGROUND OF THE INVENTION

1. Field of the Invention

The present invention relates to an electronic apparatus such as an image display device displaying an image thereon and a recording apparatus recording an image.

2. Description of the Related Art

In general, an apparatus handling image data such as a printer recording/printing an image on a recording medium such as printing paper includes a display unit (display) for displaying an image and an input unit such as an operation panel via which information is input by a user. Further, normally, in the apparatus provided with the display unit as described above, a power supply switch for turning a power supply ON/OFF is provided on a body of the apparatus. Then, when a user begins to use the apparatus, the user operates the power supply switch to turn the power supply ON, and then operates the input unit appropriately to make the apparatus perform desired operations such as displaying images on the display unit and printing a displayed image.

However, normally, the power supply switch is provided at a position a little away from the display unit for displaying an image and the input unit for the user operation. A user often forgets to turn the power supply OFF by operating the power supply switch, after operating the input unit such as an operation panel to make the apparatus perform a desired operation. Then, power is wastefully consumed while the apparatus is not in use.

SUMMARY OF THE INVENTION

An object of the present invention is to provide an electronic apparatus such as an image display device which is capable of suppressing wasteful power consumption to be consumed when not in use.

According to a first aspect of the present invention, there is provided an electronic apparatus which operates in a plurality of operation modes, including:

an input mechanism including a sheet-shaped base member which has a flexibility and is arranged to spread in a plane direction, and a bending detector which is disposed on a front surface of the base member and which detects an elastic bending deformation generated in the base member;

a power supply device which supplies a power;

a bending deformation judging mechanism which judges whether or not a predetermined first bending deformation mode is generated in the base member based on a detection result of the bending detector;

a controller which controls an operation of the electronic apparatus; and a mode changing mechanism which changes an operation mode of the electronic apparatus from a normal mode to a low power mode under a condition that the bending deformation determining mechanism judges that the first bending deformation mode is generated in the base member, the normal mode being an operation mode in which the electronic apparatus operates with a predetermined power consumption, and the low power mode being an operation mode in which the electronic apparatus operates with a low power consumption lower than the predetermined power consumption.

In the present invention, an electronic apparatus has a base material having flexibility and foldable. On the base material, for example, a display unit displaying an image thereon may also be provided integrally. Then, when a predetermined first bending deformation mode is generated in the base material by folding the base material or the like, an operation mode of the electronic apparatus shifts to a low power mode from a normal mode. When the display unit is integrally with the base material, for example, the operation mode shifts to the low power mode from the normal mode capable of displaying an image. Therefore, even when a user forgets to turn off a power supply after use of an image display device is finished, for example, the user only performs an action to fold the base material unconsciously in housing the base material at a predetermined housing position or the like after the use is finished, thereby enabling the operation mode to shift to the low power mode, and thus it is possible to suppress wasteful power consumption to be consumed when not in use.

BRIEF DESCRIPTION OF THE DRAWINGS

FIG. 6 is a view showing output signals of bending detecting sensors corresponding to the seven types of the bending deformation modes as shown in FIGS. 5A to 5G and processing contents assigned to the bending deformation modes;

DETAILED DESCRIPTION OF THE PREFERRED EMBODIMENTS

Next, an embodiment of the present teaching will be explained.

Figure 1:
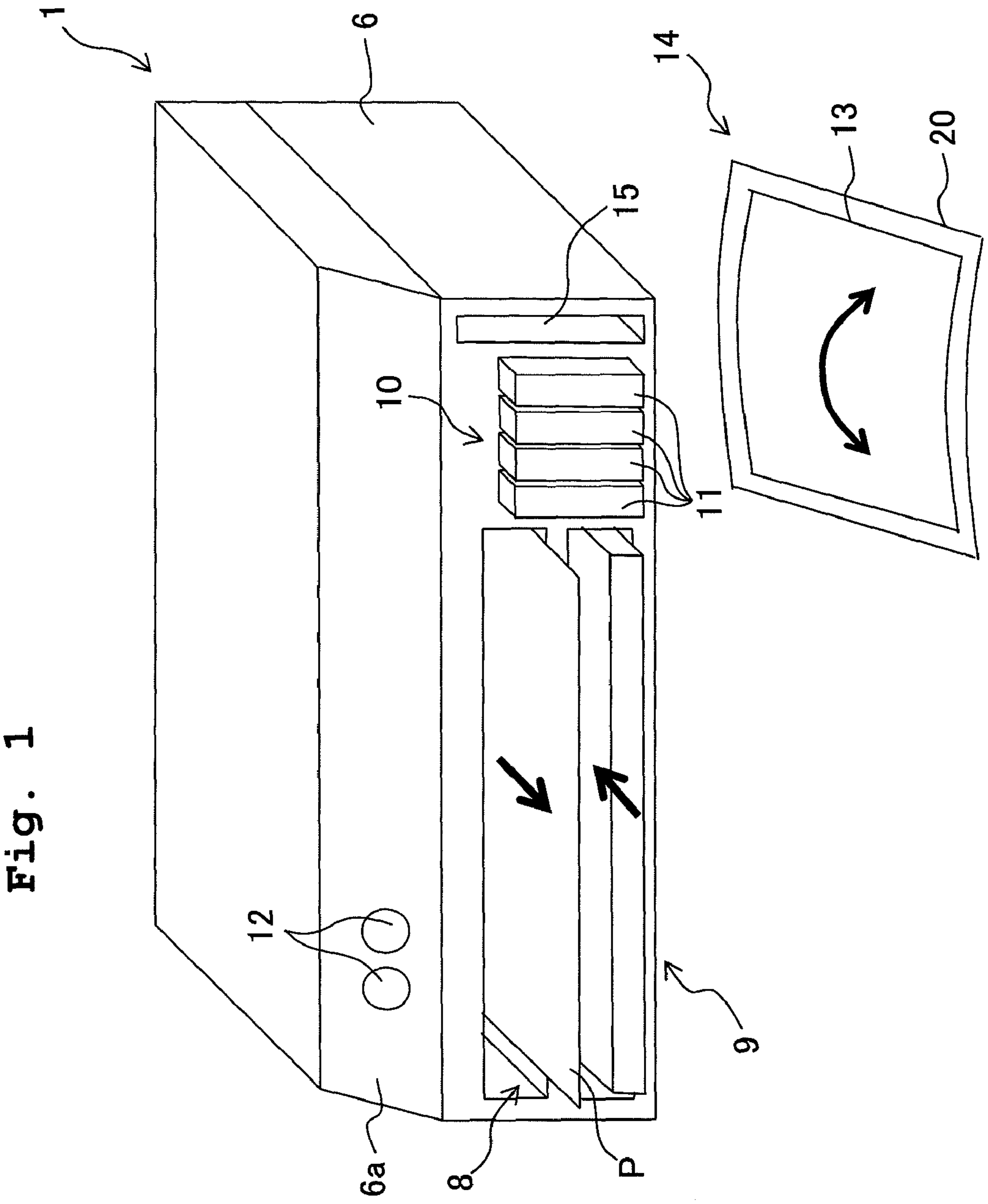
FIG. 1 is a perspective view of a printer (in a use state) according to an embodiment.
Figure 2:
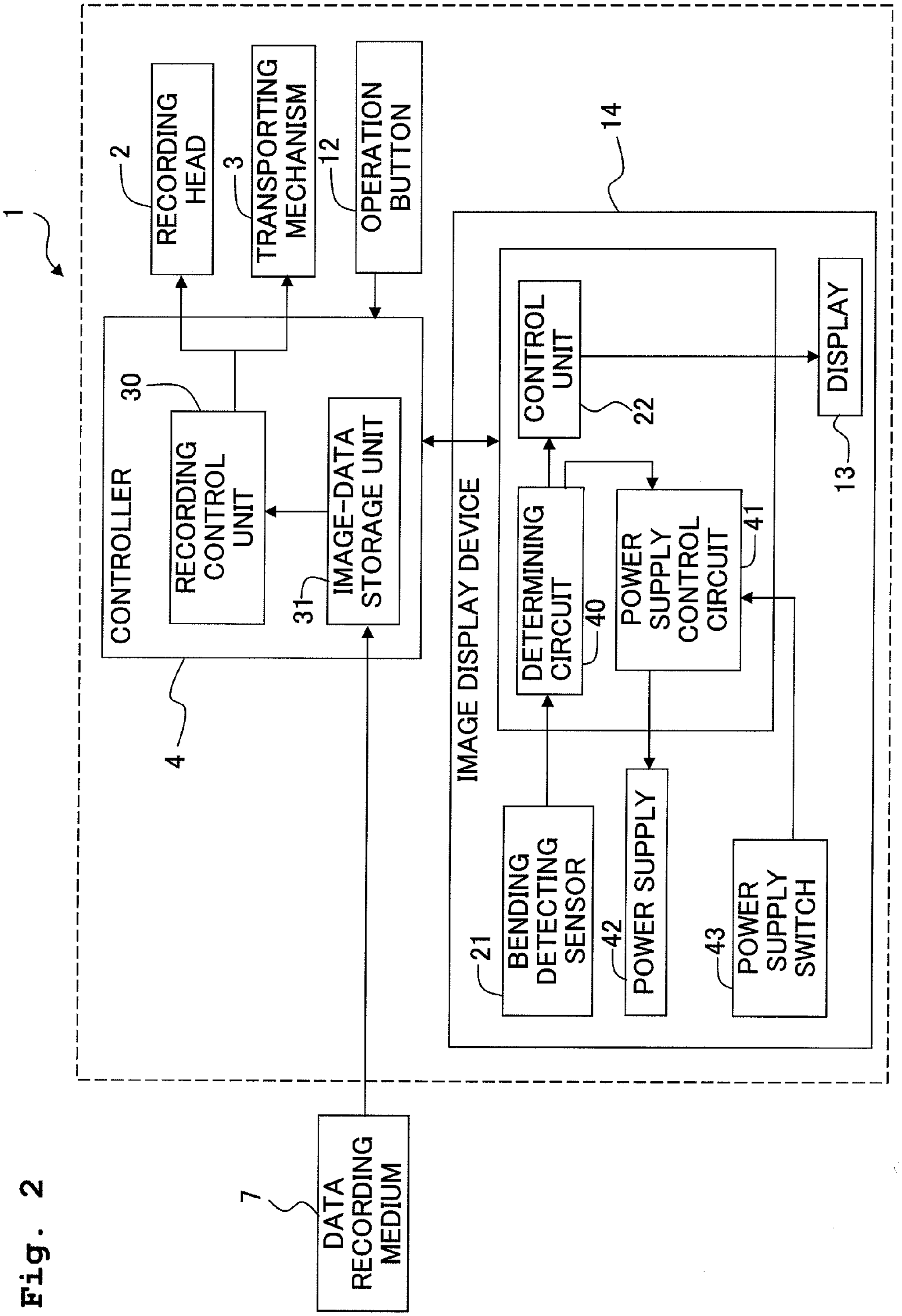
FIG. 2 is a block diagram schematically showing a control system of the printer.

As shown in FIGS. 1 and 2, a printer 1 (recording apparatus) in a first embodiment includes a recording head 2 (an image recording unit) recording an image on printing paper P (a recording medium), a transporting mechanism 3 transporting the printing paper P in a predetermined direction (forward direction in FIG. 1), and a controller 4 controlling various mechanisms, of the printer 1, including the recording head 2 and the transporting mechanism 3.

As shown in FIG. 1, the printer 1 has a body 6 having a substantially rectangular parallelepiped shape, in which the recording head 2, the transporting mechanism 3, the controller 4, and so on are accommodated. As the recording head 2, any types of the recording head such as an ink-jet type, a laser type, or a heat transfer type can be used for performing printing on the printing paper P. While a data recording medium 7 (see FIG. 2) in which image data are recorded is connected to the printer 1, the recording head 2 records, on the printing paper P, an image of image data (an image file) input from the data recording medium 7, based on a command from the controller 4. Note that, in the explanation below, one piece of image data (an image file) refers to a block of data for an image.

A part of a lower half portion of the body 6 is open toward a front side, and in this opening portion, a paper feed try 9 on which the printing paper P is put and a paper discharge tray 8 to which the printing paper P having an image recorded thereon is discharged are provided. Then, the transporting mechanism 3 transports the printing paper P put on the paper feed tray 9 to the recording head 2 in the body 6 by a transporting roller rotary-driven by a motor, and discharges the printing paper P, on which an image has been recorded by the recording head 2, to the paper discharge tray 8 provided in the front side of the body 6.

On a front surface of the lower half portion of the body 6, a cartridge attaching unit 10 is provided on a side of the paper feed tray 9 and the paper discharge tray 8. Four ink cartridges 11 containing four color inks (yellow, magenta, cyan, and black) respectively are detachably attached in the cartridge attaching unit 10. Further, at a portion adjacent to the cartridge attaching unit 10 in the body 6, a housing unit 15, in which a later-described image display device 14 which is folded is housed, is provided.

An upper portion of the body 6 is inclined to face a user staying at a near side of the plane of the paper in FIG. 1, and a plurality of operation buttons 12 to be operated by a user are provided on an inclined surface 6*a*.

Further, the printer 1 includes the image display device 14 which displays an image to be printed on the printing paper P. The image display device 14 can mutually transmit/receive data to/from the controller 4 (see FIG. 2) accommodated in the body 6 by the wireless communication. Alternatively, the image display device 14 may also be connected to the controller 4 via a cable (wire communication).

As shown in FIGS. 1 to 3B, the image display device 14 includes a sheet-shaped base member 20 having flexibility, a display 13 integrally provided on the base member 20 and capable of displaying an image thereon, a control unit 22 (see FIG. 2) controlling the display 13, bending detecting sensors 21 (a bending detection unit, a curvature detecting unit) detecting bending deformations of the base member 20, and a judging circuit 40 (bending deformation judging mechanism) judges bending deformation modes of the base member 20 based on detection results of the bending detecting sensors 21.

When a user tries to change an image to be displayed on the display 13, the user operates the base member 20 of the image display device 14 by bending the base member 20 like a paper. At this time, a bending deformation is generated in the base member 20, and the bending deformation is detected by the plural (five) bending detecting sensors 21 provided on the base member 20. Then, the judging circuit 40 judges a mode of the bending deformation of the base member 20 based on detection results of these bending detecting sensors 21, and based on the determination, the control unit 22 changes an image to be displayed on the display 13. In addition to the above, the image display device 14 in this embodiment can also turn a power supply OFF based on a mode of the bending deformation of the base member 20 judged in the judging circuit 40. Hereinafter, a concrete constitution of the image display device 14 achieving the above operation will be explained in detail. Note that a right and left direction in FIGS. 3A and 3B is defined as a right and left direction in the following explanation.

Figure 3A:
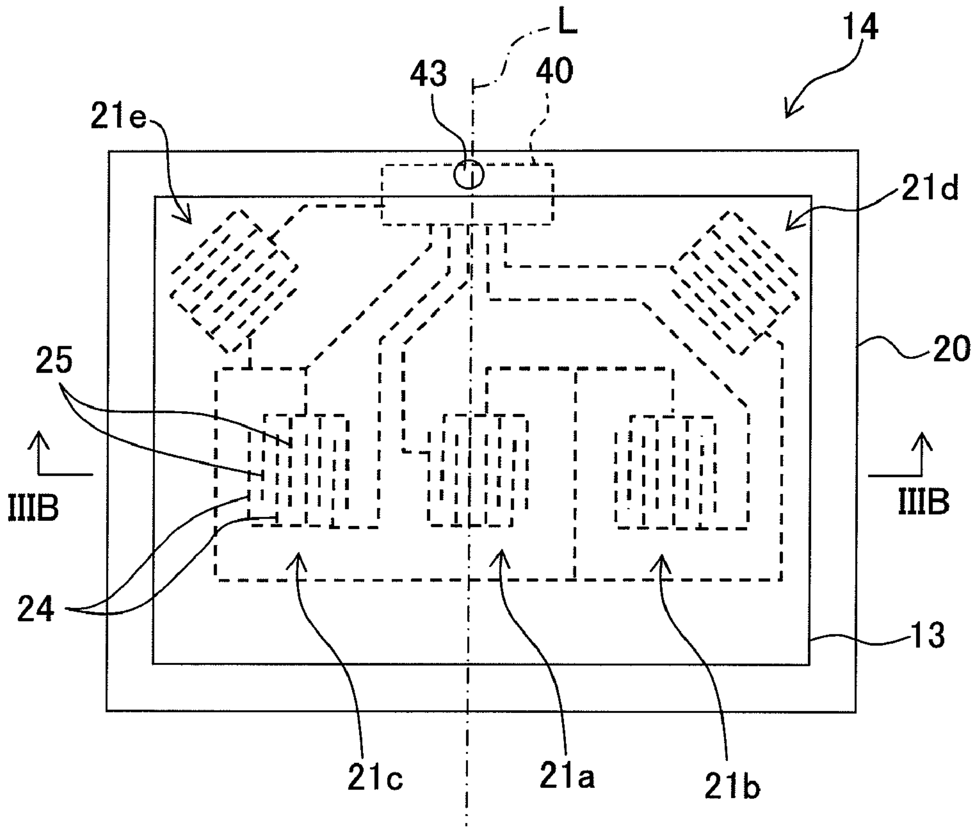
FIG. 3A is a plane view of an image display device and FIG. 3B is a cross-sectional view taken along IIIB-IIB line in FIG. 3A.
Figure 3B:
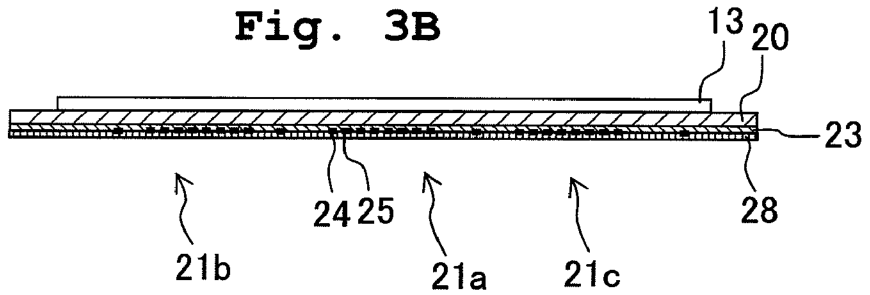

As shown in FIG. 3A, the base member 20 is formed in a rectangular shape in a plane view. The flexible base member 20A can be formed by a resin sheet made of a synthetic resin material such as polyimide, or a thin plate made of a metallic material such as aluminum alloy or stainless steel, or the like. Further, a power supply switch 43 switching ON/OFF of a power supply 42 (see FIG. 2) which supplies a power to each of the units such as the display 13 of the image display device 14 is provided on an upper surface of the base member 20.

The display 13 is disposed at a center portion of a front surface of the base member 20, (which is a surface on the near side of the paper plane in FIG. 3A), and the display 13 and the base member 20 are integrally bendable. As an example of the above described display 13, it is possible to cite what is called an electronic paper. A thickness of the electronic paper is the same as that of a paper (about several tenths of a millimeter) and is capable of displaying and erasing data by applying voltage thereto.

On a rear surface of the base member 20, (a surface opposite to the display 13, a surface on a far side of the paper plane in FIG. 3A), the five bending detecting sensors (first bending detecting sensor 21*a* to fifth bending detecting sensor 21*e*) are provided. As shown in FIG. 3A, the first bending detecting sensor 21*a* is positioned on a straight line L passing a center of the rectangular-shaped base member 20 and connecting midpoints of two longer sides (center line in a longitudinal direction). That is, the first bending detecting sensor 21*a* is provided in a substantially center region of the base member 20 in a plane view. Further, the second bending detecting sensor 21*b* is arranged on the right of the first bending detecting sensor 21*a* and the third bending detecting sensor 21*c* is arranged on the left of the first bending detecting sensor 21*a*, respectively. The fourth bending detecting sensor 21*d* is arranged at an upper right corner portion of the rectangular-shaped base member 20 and the fifth bending detecting sensor 21*e* is arranged at an upper left corner portion of the rectangular-shaped base member 20, respectively.

Further, the first to fifth bending detecting sensors 21*a* to 21*e* are not limited in a sensor of a particular type as long as they are capable of detecting bending deformations of the base member 20. In this embodiment, piezoelectric sensors, which convert distortion generated in an object into voltage signals by a mechanical-electrical conversion effect of a piezoelectric element (piezoelectric effect), are employed.

Figure 4A:
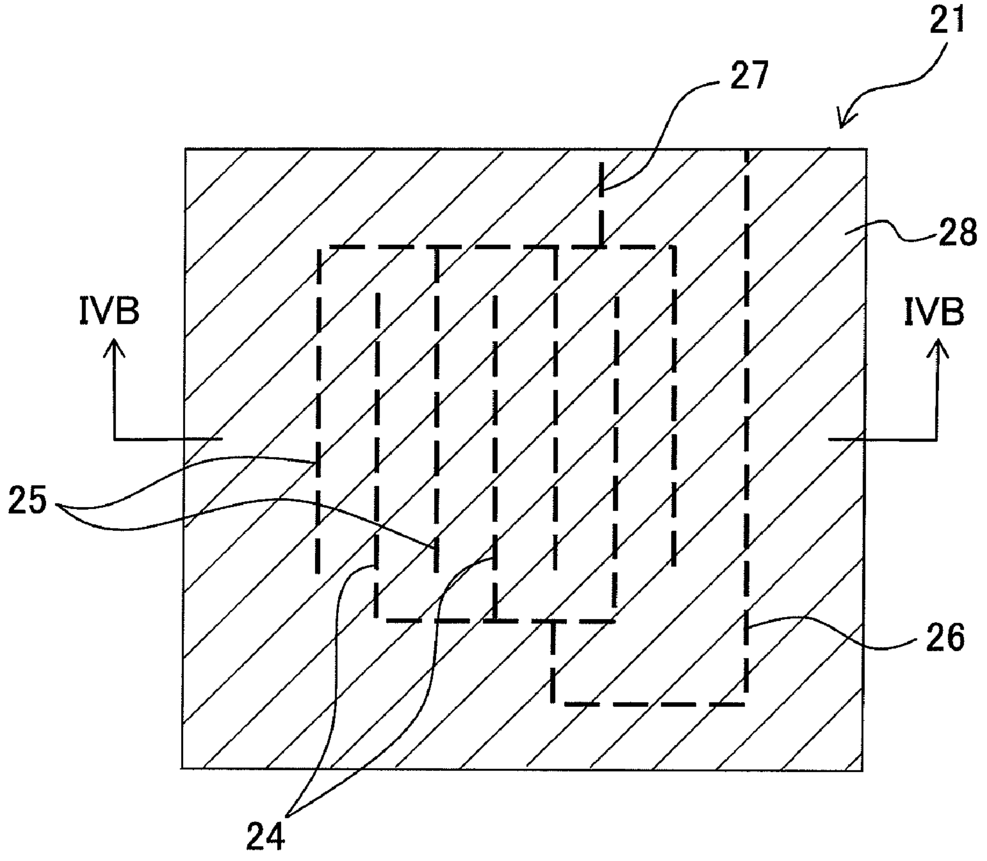
FIG. 4A is a view of a bending detecting sensor seen from a rear surface side of a base material and FIG. 4B is a cross-sectional view taken along IVB-IVB line in FIG. 4A.
Figure 4B:
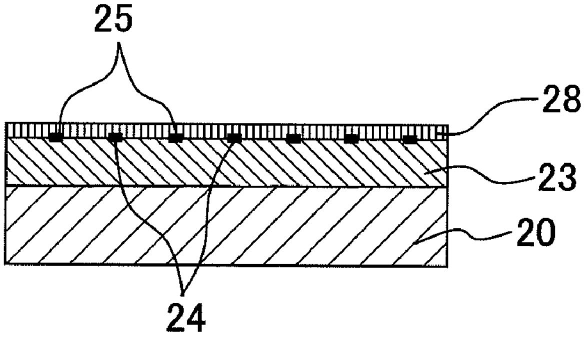

The first to fifth bending detecting sensors 21*a* to 21*e* have similar constitutions, and thus the first bending detecting sensor 21*a* will be explained as an example hereinafter. As shown in FIGS. 4A and 4B, the first bending detecting sensor 21*a* includes a piezoelectric layer 23 provided on the rear surface of the base member 20 and two types of electrodes 24, 25 provided on a surface, of the piezoelectric layer 23, opposite to the base member 20.

The piezoelectric layer 23 is made of, for example, a piezoelectric material whose major component is lead zirconate titanate (PZT) that is a solid solution of lead titanate and lead zirconate and is a ferroelectric. The piezoelectric layer 23 can be formed on the rear surface of the base member 20 by an aerosol deposition method, a sputtering method, a sol gel method, or the like. Note that in this embodiment, as shown in FIG. 3B, the piezoelectric layer 23 is formed entirely on the rear surface of the base member 20 and is provided in common with the first to fifth bending detecting sensors 21*a* to 21*e*.

On a front surface of the piezoelectric layer 23 (the surface opposite to the base member 20), the first electrodes 24 in a comb teeth shape, which extend in one direction parallel to a plane direction and are electrically connected with each other, and the second electrodes 25 in a comb teeth shape similarly, which extend parallel to these first electrodes 24 and are electrically connected with each other, are provided. Further, the first electrodes 24 and the second electrodes 25 are disposed alternately at intervals. The first electrodes 24 and second electrodes 25 are formed with a conductive material such as gold, copper, silver, palladium, platinum, or titanium by a screen printing method, a vapor deposition method or the like. Note that, as shown in FIG. 3A, regarding the first to third bending detecting sensors 21*a* to 21*c* provided in the center region of the base member 20, the first electrodes 24 and the second electrodes 25 extend parallel to a shorter-side direction of the base member 20 (an up-down direction in FIG. 3A, a width direction of the base member 20). Further, regarding the fourth and fifth bending detecting sensors 21*d*, 21*e* provided at the corner portions of the base member 20, an extending direction of the first electrodes 24 and the second electrodes 25 inclines inwardly with respect to the shorter-side direction of the base member 20 in a plane view.

As shown in FIG. 4A, a wiring 26 is led from the first electrodes 24 which are electrically communicated with each other, and the wiring 26 led from the first electrodes 24 is connected to the judging circuit 40 (see FIG. 3A). Further, a wiring 27 is led from the second electrodes 25 which are electrically communicated with each other, and the wiring 27 led from the second electrodes 25 is connected to ground, and all the second electrodes 25 are always kept at ground potential through the wiring 27. Note that the piezoelectric layer 23 is polarized beforehand in a direction parallel to the plane direction of the piezoelectric layer 23, the direction directing from the first electrodes 24 to the second electrodes 25.

As shown in FIGS. 4A and 4B, an insulating layer 28 is formed, on the front surface of the piezoelectric layer 23 (surface opposite to the base member 20), to cover all the first electrodes 24 and second electrodes 25 of the first bending detecting sensor 21*a*. The insulating layer 28 can be made of a synthetic resin material having an insulating property such as polyimide. The first electrodes 24 and the second electrodes 25 are covered with the insulating layer 28 in this manner, and thereby peeling or failure of the first and second electrodes 24, 25, or a short circuit between the first electrodes 24 and the second electrodes 25, or the like can be prevented.

Next, an operation in detecting bending deformations of the base member 20 by the first bending detecting sensor 21*a* will be explained. Note that the second to fifth bending detecting sensors 21*b* to 21*e* also operate similarly to the first bending detecting sensor 21*a*, therefore, an explanation thereof is omitted. When a bending deformation is generated in the region, of the base member 20, having the first bending detecting sensor 21*a*, the piezoelectric layer 23 is extended or compressed a direction which is parallel to a polarization direction and is perpendicular to the extending direction of the first and second electrodes 24, 25 (the right-left direction in FIG. 4A). Then, potential differences are generated between the first electrodes 24 and the second electrodes 25 that face to one another in accordance with an extension or contraction deformation of the piezoelectric layer 23 (a piezoelectric effect).

More concretely, when the extension (tensile) deformation is generated, at portions of the piezoelectric layer 23 between the first electrodes 24 and the second electrodes 25, in the direction perpendicular to the extending direction of the electrodes, positive potential higher than potential of the second electrodes 25 (the ground potential) is generated in the first electrodes 24. On the other hand, when the contraction (compression) deformation is generated, at the portions between the first electrodes 24 and the second electrodes 25 of the piezoelectric layer 23, in the direction perpendicular to the extending direction of the electrodes, negative potential lower than the potential of the second electrodes 25 (ground potential) is generated in the first electrodes 24.

Here, in this embodiment, the first to fifth bending detecting sensors 21*a* to 21*e* are provided, on the rear surface of the base member 20, at the regions different from one another. Further, the judging circuit 40 where output voltage signals of the first to fifth bending detecting sensors 21*a* to 21*e* are input is provided on the base member 20. Then, the judging circuit 40 can detect the deformations (extension and compression) of the base member 20 in the five different regions of the base member 20, respectively, according to changes in output voltages of the first to fifth bending detecting sensors 21*a* to 21*e*. This makes it possible to distinctively detect the plurality of bending deformation modes of the base member 20. As shown in FIGS. 5A to 5G, a bending position and/or a bending direction in one of the bending deformation modes are/is different from those in another mode.

When the base member 20 is entirely curved to be convex upward around an axis parallel to the shorter sides of the base member 20, as shown in FIG. 5(*a*), for example, the piezoelectric layer 23 provided on the rear surface of the base member 20 is compressed in the center region of the base member 20. Thus, potentials of the first electrodes 24 of the first to third bending detecting sensors 21*a* to 21*c* in the above center region become lower than those of the second electrodes 25 (the ground potential), then negative voltage signals are output from first, second and third bending detecting sensors, respectively. On the other hand, the piezoelectric layer 23 at the corner portions of the base member 20 are hardly deformed, and thus potentials of the first electrodes 24 in the fourth and fifth bending detecting sensors 21*d*, 21*e* provided at the two corner portions respectively hardly change from the ground potential. Therefore, the output voltages from the fourth and fifth bending detecting sensors remain at 0 V.

When it is possible to distinctively detect the plural bending deformation modes of the base member 20 in this manner, it is possible to assign various operations of the image display device 14 to the respective bending deformation modes. Note that the detection of seven types of the bending deformation modes shown in FIGS. 5A to 5G and the assignment of the operations of the image display device 14 to these bending deformation modes will be explained later in further detail.

Next, an electrical configuration of the printer 1 will be explained in detail with reference to a block diagram in FIG. 2. The controller 4 mainly includes a Central Processing Unit (CPU), a Read Only Memory (ROM) in which programs, data, and so on for controlling various mechanism of the printer 1 are stored, a Random Access Memory (RAM) in which data to be processed in the CPU is stored, an input/output interface via which signals are input/output to/from an external apparatus.

As shown in FIG. 2, the controller 4 further includes a recording control unit 30 and an image data storage unit 31 in which image data input from the data recording medium 7 are stored. A plurality of image data is recorded in the data recording medium 7, the image data being previously arranged in order based on a certain prejudged condition such as names of data files (for example, in alphabetical order) or preparation dates of the image data. The image data are classified into image folders in the data recording medium 7. Then, while the data recording medium 7 is connected to the printer 1, the plural image data read from the data recording medium 7 are stored in the image data storage unit 31.

Note that the data recording medium 7 where image data are recorded may be any kinds of storage devices such as a USB memory and a memory card which are connected when inserted in a slot or the like of the printer, or an external storage device that is wire-connected by a cable or is wirelessly connected to the controller 4. Further, the data recorded in the data recording medium 7 may also be not only still image data photographed by a digital camera, but also moving image data photographed by a digital video camera. Here, the moving image data is a set of a plurality of temporally subsequent still image data. When the moving image data is input from the data recording medium 7, plural still image data are extracted from the input moving image data in the controller 4. Then the printer 1 may display a part of the plural still image data on the display 13, or may print one of the still image on the printing paper P.

The recording control unit 30 is configured such that the recording control unit 31 refers to data stored in the image data storage unit 31 and that the recording control unit 31 controls the recording head 2 and the transporting mechanism 3 respectively to print an image of image data selected by a user on the printing paper P.

On the other hand, the image display device 14 includes the control unit 22 (a display control mechanism) controlling the entire image display device 14 including the display 13. The control unit 22 includes, for example, a microcomputer having a CPU, a ROM, a RAM, and so on. In other words, various programs such as a control program of the display 13 are stored in a ROM of a microcomputer, and the programs stored in the ROM are executed in a CPU, and thereby a function of the control unit 22 is achieved.

Further, the image display device 14 includes the above-described judging circuit 40 and a power supply control circuit 41, the judging circuit 40 determining the bending deformation modes of the base member 20 based on the output signals of the first to fifth bending detecting sensors 21*a* to 21*e*, and a power supply control circuit 41 controlling the power supply which supplies power to the units such as the display 13 of the image display device 14. The power supply control circuit 41 switches ON/OFF of the power supply when the power supply switch 43 is operated by a user.

When the judging circuit 40 judges or determines the bending deformation mode of the base member 20 based on the output signals of the first to fifth bending detecting sensors 21*a* to 21*e*, the control unit 22 controls the units of the image display device 14 in accordance with the judged bending deformation mode. Concretely, change of an image to be displayed on the display 13, execution/cancellation of a printing operation by the recording head 2, and turning OFF of the power supply 42 are performed.

Hereinafter, the bending deformation modes of the base member 20 each of which occurs when the base member 20 is bended/folded by a user and processing contents to be executed accordingly will be explained with reference to FIGS. 5A to 5G and 6. Note that indices (a) to (g) in a row of "deformation mode" in FIG. 6 correspond to the deformation modes as shown in FIGS. 5A to 5G respectively. Further, an index "+" indicates the case when a positive voltage signal is output from the bending detecting sensors 21, an index "−" indicates the case when a negative voltage signal is output, and an index "GND" indicates the case when a ground signal is output, respectively.

A. Enlargement/Reduction of Images

Figure 5A:
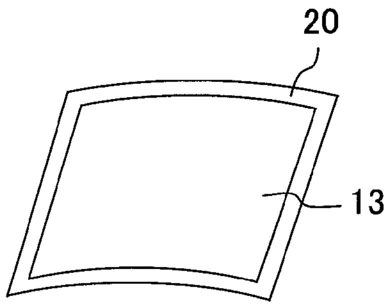
FIG. 5A to FIG. 5G are views showing seven types of bending deformation modes of the base material.

As shown in FIG. 5A, when the rectangular sheet-shaped base member 20 is bended to be convex upward (to the near side seen from a user) around an axis parallel to the shorter sides of the base member 20 by a user on the whole, the center portion of the piezoelectric layer 23 disposed on the rear surface of the base member 20 contracts in the longitudinal direction of the base member 20. Then, in the first to third bending detecting sensors 21*a* to 21*c* disposed in the center region of the base member 20, negative potentials lower than the ground potential are generated in the first electrodes 24. Thus, as shown in FIG. 6, the negative voltage signals (−) are output from the first to third bending detecting sensors 21*a* to 21*c* to the judging circuit 40 respectively. On the other hand, deformations are hardly generated at the corner portions of the base member 20, and thus the output voltage signals of the fourth and fifth bending detecting sensors 21*d*, 21*e* disposed at the corner portions hardly change from the ground. Based on these output voltage signals, the judging circuit 40 judges the base member 20 is bended to be convex upward on the whole to transmit a judgment signal to the control unit 22. After receiving the above judgment signal from the judging circuit 40, the control unit 22 controls the display 13 to display an enlarged image in which a center portion of the currently displayed image is enlarged.

Figure 5B:
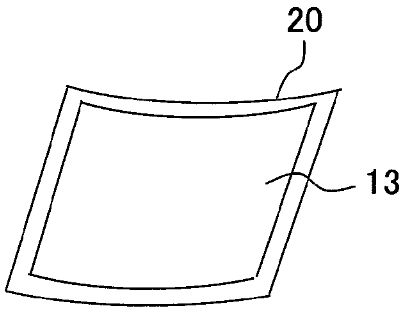

On the other hand, as shown in FIG. 5B, when the base member 20 is bended to be convex downward (to the far side seen from a user) by a user on the whole, the piezoelectric layer 23 extends in the longitudinal direction of the base member 20. At this time, as shown in FIG. 6, the positive voltage signals (+) are output from the first to third bending detecting sensors 21*a* to 21*c* to the judging circuit 40, respectively. Based on these output voltage signals, the judging circuit 40 judges that the base member 20 is bended to be convex downward on the whole to transmit a judgment signal to the control unit 22. After receiving the above judgment signal from the judging circuit 40, the control unit 22 controls the display 13 to display a reduced image in which a center portion of a currently displayed image is reduced.

B. Changing of Images
(Forward-Feed/Backward-Feed of Images)

Figure 5C:
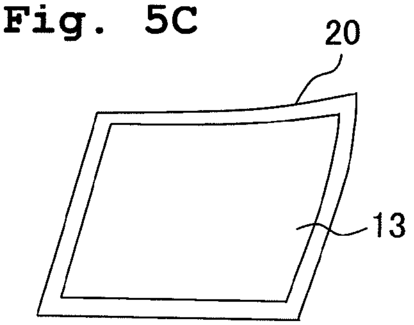

As shown in FIG. 5C, when the upper right corner portion of the base member 20 is bended upward by a user, the piezoelectric layer 23 locally extends only at the above corner portion. Thus, as shown in FIG. 6, the positive voltage signal (+) is output from the fourth bending detecting sensor 21*d* provided at the upper right corner portion to the judging circuit 40. Note that the regions of the base member 20 except the upper right corner portion are not deformed, and thus the output voltages of the remaining first to third bending detecting sensors 21*a* to 21*c* and fifth bending detecting sensor 21*e* remain at 0 V. Based on these output voltage signals, the judging circuit 40 judges that the upper right corner portion of the base member 20 is bended upward to transmit a judgment signal to the control unit 22. After receiving the above judgment signal from the judging circuit 40, the control unit 22 selects the image data immediately after the currently displayed image data from among plural image data stored in the image data storage unit 31 in a state of being arranged in order, and switches an image to be displayed on the display 13 to an image of the above selected image data.

Figure 5D:
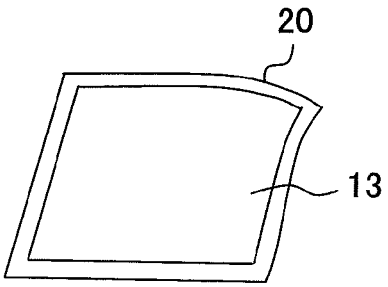

Further, as shown in FIG. 5D, when the upper right corner portion of the base member 20 is bended downward by a user, the piezoelectric layer 23 locally contracts only at the upper right corner portion. Thus, as shown in FIG. 6, the negative voltage signal (–) is output from the fourth bending detecting sensor 21*d* provided at the upper right corner portion to the judging circuit 40, and on the other hand, the output voltages of the remaining first to third bending detecting sensors 21*a* to 21*c* and fifth bending detecting sensor 21*e* remain at 0 V. Based on these output voltage signals, the judging circuit 40 judges that the upper right corner portion of the base member 20 is bended downward to transmit a judgment signal to the control unit 22. After receiving the above judgment signal from the judging circuit 40, the control unit 22 selects the image data immediately before the currently displayed image data from among plural image data stored in the image data storage unit 31 in a state of being arranged in order, and switches an image to be displayed on the display 13 to an image of the above selected image data.

C. Start/Cancellation of Printing

Figure 5E:
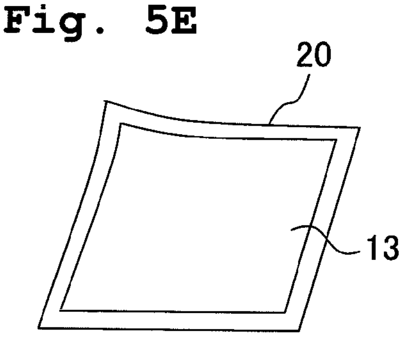

As shown in FIG. 5E, when the upper left corner portion of the base member 20 is bended upward by a user, as shown in FIG. 6, the positive voltage signal (+) is output from the fifth bending detecting sensor 21*e* provided at the upper left corner portion to the judging circuit 40, and on the other hand, the output voltages of the remaining first to fourth bending detecting sensors 21*a* to 21*d* remain at 0 V. Based on these output voltage signals, the judging circuit 40 judges that the upper left corner portion of the base member 20 is bended upward to transmit a judgment signal to the control unit 22. After receiving the above judgment signal from the judging circuit 40, the control unit 22 transmits a signal instructing printing to the controller 4 located in the body of the printer 1. Then, the recording control unit 30 in the controller 4 controls the recording head 2 and the transporting mechanism 3 to print an image being displayed on the display 13 onto the printing paper P.

Figure 5F:
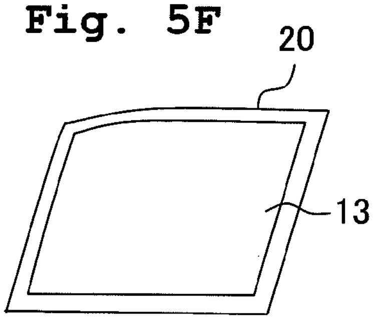

Further, as shown in FIG. 5F, when the upper left corner portion of the base member 20 is bended downward by a user, as shown in FIG. 6, the negative voltage signal (–) is output from the fifth bending detecting sensor 21*e* provided at the upper left corner portion to the judging circuit 40, and on the other hand, the output voltages of the remaining first to fourth bending detecting sensors 21*a* to 21*d* remain at 0 V. Based on these output voltage signals, the judging circuit 40 judges that the upper left corner portion of the base member 20 is bended downward to transmit a judgment signal to the control unit 22. Here, when the upper left corner portion of the base member 20 is bended downward immediately after the instruction to print an image being displayed on the display 13 is given as described above, the control unit 22 transmits a signal canceling the printing instructed previously to the controller 4. Then, the recording control unit 30 in the controller 4 makes the recording head 2 and the transporting mechanism 3 cancel the printing of the image.

D. Power Supply OFF

The above mentioned bending deformation modes (a) to (f) of the base member 20 which are related to the enlargement/reduction of images, the switching of images, and the start/cancellation of printing are performed by user's intention in order to make the printer 1 perform the operations of displaying images, printing, and so on. In contrast, a bending deformation mode that will be described here is to be detected to recognize a state where a user does not use the image display device 14 to turn the power supply 42 OFF automatically even though the power supply switch 43 is not operated by a user.

Figure 5G:
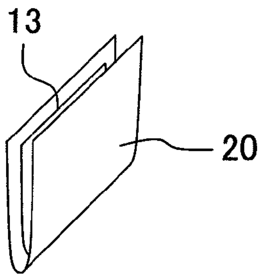
Figure 7:
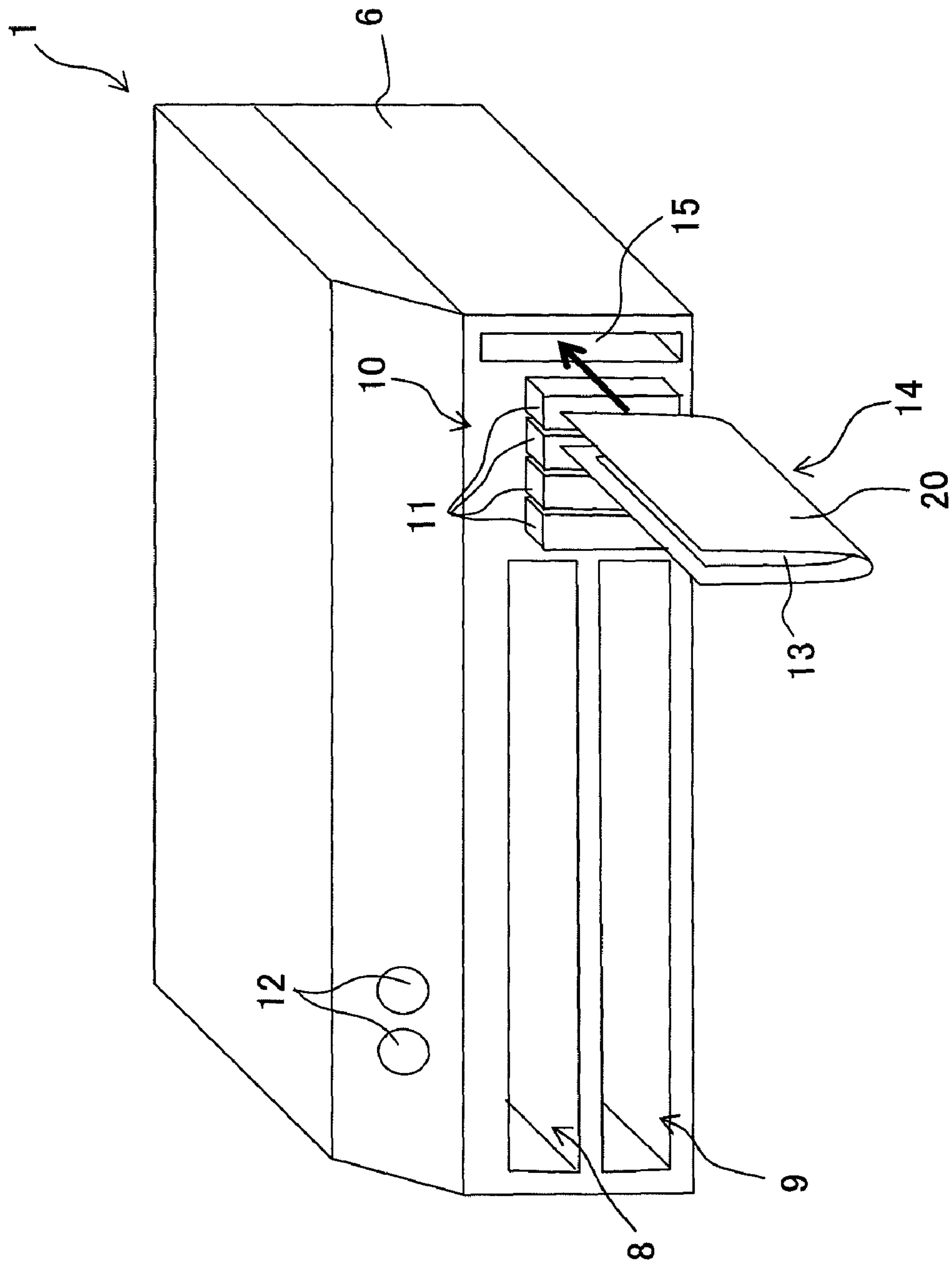
FIG. 7 is a perspective view of the printer (after use) according to this embodiment.

The above-described contents will be explained more concretely. As shown in FIG. 7, when the use of the image display device 14 is finished and the image display device 14 is housed in the housing unit 15 of the body 6, a possibility that the base member 20 is folded in two by a user is high. Further, when the base member 20 of the image display device 14 has a rectangular shape, as shown in FIG. 5G, it is natural to fold the base member 20 along the straight line L (see FIG. 3A) connecting the midpoints of the two longer sides of the base member 20 so that both end portions in the longer side direction overlap. Thus, in this embodiment, when the base member 20 is recognized to be folded in two along the straight line L, the use of the image display device 14 is judged to be finished.

When the base member 20 is folded in two along the straight line L by a user, only the portion positioned on the straight line L of the piezoelectric layer 23 extends. Thus, as shown in FIG. 6, the positive voltage signal (+) is output, to the judging circuit 40, from the first bending detecting sensor 21*a* positioned on the straight line L, and on the other hand, the output voltages of the remaining second to fifth bending detecting sensors 21*b* to 21*e* remain at 0 V. Based on these output voltage signals, the judging circuit 40 judges that the base member 20 is folded in two. When the base member 20 is folded in two in this manner, the judging circuit 40 transmits a signal to the power supply control circuit 41 so that the power supply control circuit 41 makes the power supply control circuit 41 turn the power supply 42 OFF.

Here, the power supply control circuit 41 which turns the power supply 42 OFF changes an operation mode of the display 13 from a normal mode capable of displaying an image to a low power mode in which the power consumption of the display 13 is lower than that in the normal mode. The power supply control circuit 41 corresponds to a mode changing mechanism in the present teaching. Further, the bending deformation mode of the base member 20 (twofold), which is shown in FIG. 5G and is made when the power supply 42 is turned OFF, corresponds to a first bending deformation mode in the present teaching. Further, the bending deformation modes of the base member 20, which are shown in FIGS. 5A to 5D and are made when changing images (the enlargement/reduction of images and forward-feed/backward-feed of images) are performed, correspond to a second bending deformation mode in the present teaching.

According to the image display device 14 in this embodiment, when the base member 20 is judged to be folded in two in the judging circuit 40 based on the output signals of the first to fifth bending detecting sensors 21*a* to 21*e*, the power supply 42 is turned OFF. Thus, even when a user forgets to turn the power supply 42 OFF by operating the power supply switch 43 after the use of the image display device 14 is finished, the power supply 42 is turned OFF automatically only by performing the action to fold the base member 20 unconsciously in order to house the image display device 14 in the housing unit 15 in the body 6. Thus, it is possible to suppress wasteful power consumption to be consumed when the image display device 14 is not in use. Further, the power supply 42 which supplies power to the units in the image display device 14 is turned OFF to stop power supply completely, thereby enabling power consumption to be further reduced.

Further, when the rectangular-shaped base member 20 is folded in two to be housed, it is natural to fold the base member 20 along the straight line L connecting the midpoints of the two longer sides of the base member 20 so that both end portions in the longer side direction overlap. When the base member 20 is folded in such a manner, the region on the straight line L connecting the midpoints of the two longer sides of the base member 20 is significantly bent in particular. Here, in this embodiment, since the first bending detecting sensor 21*a* which detects the bending deformation of the base member 20 in the region on the straight line L is provided on the straight line L, it is possible to securely detect that the base member 20 is folded in two from the output signal of the first bending detecting sensor 21*a*.

Further, the plural bending detecting sensors (first to fifth bending detecting sensors 21*a* to 21*e*) are provided on the base member 20, and based on the output signals of these bending detecting sensors, the plural (seven) types of the bending deformation modes of the base member 20 can be detected distinctively. Then, the plural operations of the image display device 14 are assigned to the plural types of the bending deformation modes, respectively. Thus, each of turning OFF of the power supply, changing images of the display 13, and the start/cancellation of printing can be performed by generating each of the plural types of the bending deformation modes in the single base member 20.

Next, modifications in which various modifications are added to the above-described embodiment will be explained. However, components having the constitutions similar to those of the above-described embodiment will be denoted by the same reference numerals and symbols, and explanation thereof is omitted.

First Modification

The above-described embodiment is constituted in a manner that the plural types of the bending deformation modes of the base member 20 (FIGS. 5A to 5G) are detected by the first to fifth bending detecting sensors 21*a* to 21*e* provided on the base member 20, but it is not necessary to detect the plural types of the bending deformation modes distinctively. For example, a single bending detecting sensor 21*a* may also be provided on the base member 20, and the bending detecting sensor 21*a* may also detect only a single type of a bending deformation mode (twofold or the like) in turning the power supply 42 OFF. That is, the bending detecting sensor 21*a* may also be a sensor exclusively detecting that the use is finished. In this case, other operations, of the image display device 14, such as changing images of the display 13 can be input via an appropriate input unit such as buttons provided on the base member 20 or the display 13.

Second Modification

In the above-described embodiment, the power supply control circuit 41 turns the power supply OFF completely when the judging circuit 40 judges that the first bending deformation mode (twofold or the like) is generated in the base member 20. However, it is not always necessary to turn the power supply OFF completely, and the display 13 may be shifted from a normal mode to a low power mode. In the normal mode, the display 13 can display an image, and in the low power mode, the power consumption of the display 13 is reduced more than that in the normal mode.

For example, in the low power mode, the power supply 42 may not necessarily supply driving power to the display 13, but may supply power for control to the control unit 22 and the judging circuit 40 whose power consumptions are low relatively. Alternatively, in the low power mode, a power to be supplied to the display 13 from the power supply 42 may be less than that in the normal mode in which an image is displayed on the display 13 (a sleep mode, for example).

Further, the modification may also be constituted in a manner that the operation mode of not only the display 13 in the image display device 14 but also other units (for example, the recording head 2 (image recording section) and a motor included in the transporting mechanism 3, and so on) arranged in the body is changed to the low power mode when the first bending deformation mode is detected to be generated in the base member 20 in the judging circuit 40. Concretely, the modification may also be constituted in a manner that when the first bending deformation mode of the base member 20 is detected in the judging circuit 40, a signal output after the detection is transmitted to the controller 4 arranged in the body and the controller 4 controls a power supply arranged in the body by turning the power supply OFF or the like.

Third Modification

The bending deformation mode (first bending deformation mode) of the base member 20 for changing the operation mode of the display 13 to the low power mode is not limited to the one described in the above-described embodiment.

For example, the rectangular-shaped base member 20 may also be folded in two along not the straight line L passing the midpoints of the two long-sides of the base member 20 shown in FIG. 3A but a straight line passing midpoints of the two short-sides of the base member 20 (a center line in a lateral direction). Alternatively, the base member 20 may also be folded in three. Further, the base member 20 is not limited to the one in a rectangular shape in a plane view, and ones in various shapes such as a square shape, a triangular shape, and a circular shape can be employed. When the base member 20 is folded appropriately in accordance with a shape thereof, the operation mode may also be changed to the low power mode.

Further, after the use of the image display device 14 is finished, it is also sufficiently thought that the sheet-shaped base member 20 is rolled to be housed in a housing unit in a cylindrical shape besides that the base member 20 is folded in two as described in the above embodiment. Thus, as shown in FIG. 8, it is assumed that the base member 20 is rolled to be housed after the use of the image display device 14 is finished, and a form made after the base member 20 is rolled in one direction in this manner may also be set as the first bending deformation mode for the shift to the low power mode.

Figure 8:
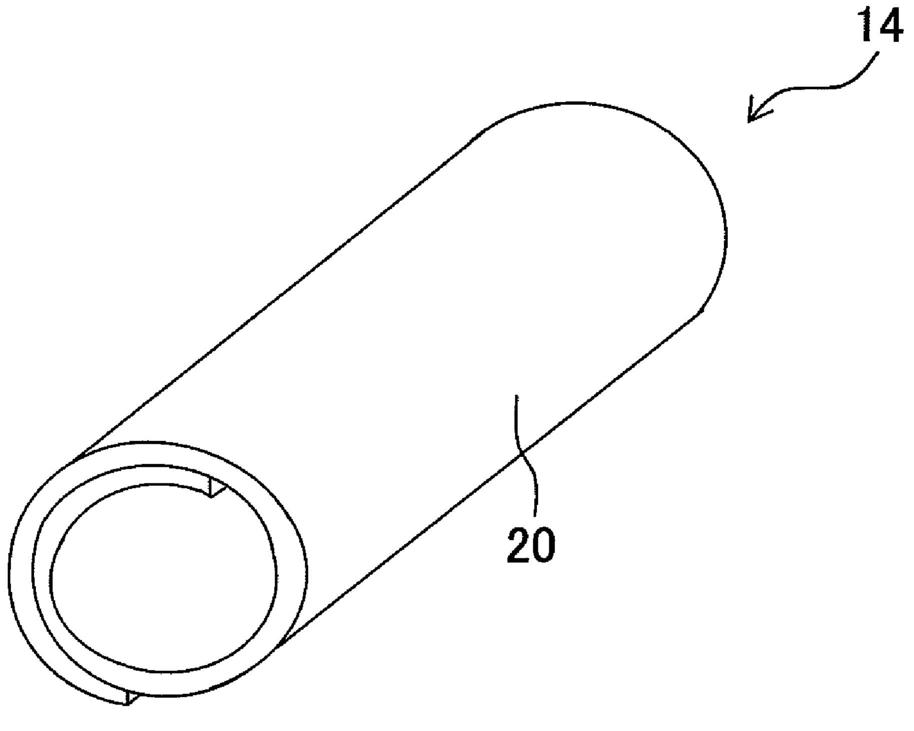
FIG. 8 is a view showing a modification of a bending deformation mode in which the base material is rolled in one direction.

In order to detect the bending deformation mode of the base member 20 as shown in FIG. 8, first, as shown in FIG. 3A, a plurality of bending detecting sensors, which are positioned side by side along one direction parallel to the plane direction of the base member 20 and which detect bending deformations in a plurality of regions of the base member 20 respectively, are needed. For example, in the image display device 14 as shown in FIG. 3A, this bending deformation mode can be detected by the first to third bending detecting sensors 21*a* to 21*c*. In this case, when bending deformations in the plural regions arranged side by side in the one direction are detected in a prejudged order by the first to third bending detecting sensors 21*a* to 21*c*, the judging circuit 40 judges that the first bending deformation mode, in which the base member 20 is rolled in a prejudged one direction, is generated in the base member 20. The embodiment in FIG. 3A is cited as an example to be explained concretely. When the base member 20 is rolled from the right in FIG. 3A, the output voltages change from "0 V (GND)" to "+" in the order of the second bending detecting sensor 21*b* positioned on the right, the first bending detecting sensor 21*a* in the middle, and the third bending detecting sensor 21*c* positioned on the left. The judging circuit 40 judges that the base member 20 is rolled based on the change in the output signals of the first to third bending detecting sensors 21*a* to 21*c*.

Note that it is natural to roll the base member 20 along the long-side direction (a longitudinal direction of the base member 20) when the base member 20 which is elongated in one direction is rolled to be housed as shown in FIG. 3A. When the base member 20 is rolled in this manner, the bending deformations are sequentially generated in the base member 20 along the long-side direction. Thus, it is preferable that disposition regions of the third, first and second bending detecting sensors 21*c*, 21*a*, and 21*b* (the regions where the bending deformations are detected) are arranged in the long-side direction of the base member 20 as shown in FIG. 3A so that the above bending deformation mode can be detected securely.

Fourth Modification

The modification may also be constituted in a manner that the power supply control circuit 41 changes the operation mode of the display 13 from the low power mode to the normal mode, when the judging circuit 40 judges that a bending deformation in an opposite direction that is opposite to the direction in the above-described first bending deformation mode is generated in the base member 20 after the judging circuit 40 judges that the first bending deformation mode is generated in the base member 20 and after the operation mode of the display 13 is changed from the normal mode to the low power mode by the power supply control circuit 41. Hereinafter, the above will be explained concretely with reference to FIG. 5G and FIG. 6 in the above-described embodiment. When only the output voltage of the first bending detecting sensor 21*a* turns to the positive voltage (+), the judging circuit 40 judges that the twofold deformation is generated in the base member 20, and the display 13 shifts to the low power mode. After that, when only the output voltage of the first bending detecting sensor 21*a* turns to the negative voltage (−), the judging circuit 40 judges that the base member 20 is unfolded from a closed state of being folded in two as shown in FIG. 5G Thus, in this case, the power supply control circuit 41 returns the operation mode of the display 13 to the normal mode.

According to the above, when the operation mode of the display 13 is the low power mode, the display 13 is shifted to the low power mode only by folding the base member 20 in the opposite direction that is opposite to the direction in the first bending deformation mode. Therefore, it is possible to return the operation mode of the display 13 to the normal mode from the low power mode simply. Note that in order to achieve the above-described operation, the judging circuit 40 has to be able to judge whether or not the base member 20 is bended during the low power mode, and thus power supply to the display 13 may be stopped, but power for control needs to be supplied to at least the judging circuit 40.

Fifth Modification

The constitution of the bending detecting sensors detecting the bending deformations of the base member 20 is not limited to the one in the above-described embodiment.

The number of the bending detecting sensors to be provided on the base member 20 can be changed appropriately. For example, the more the number of the bending detecting sensors is increased, the more the bending deformation modes can be judged. Further, even when the single bending deformation mode is judged, the number of the bending detecting sensors is increased and the output signals from the increased bending detecting sensors are used, and thereby more accurate determination can be possible.

Figure 9A:
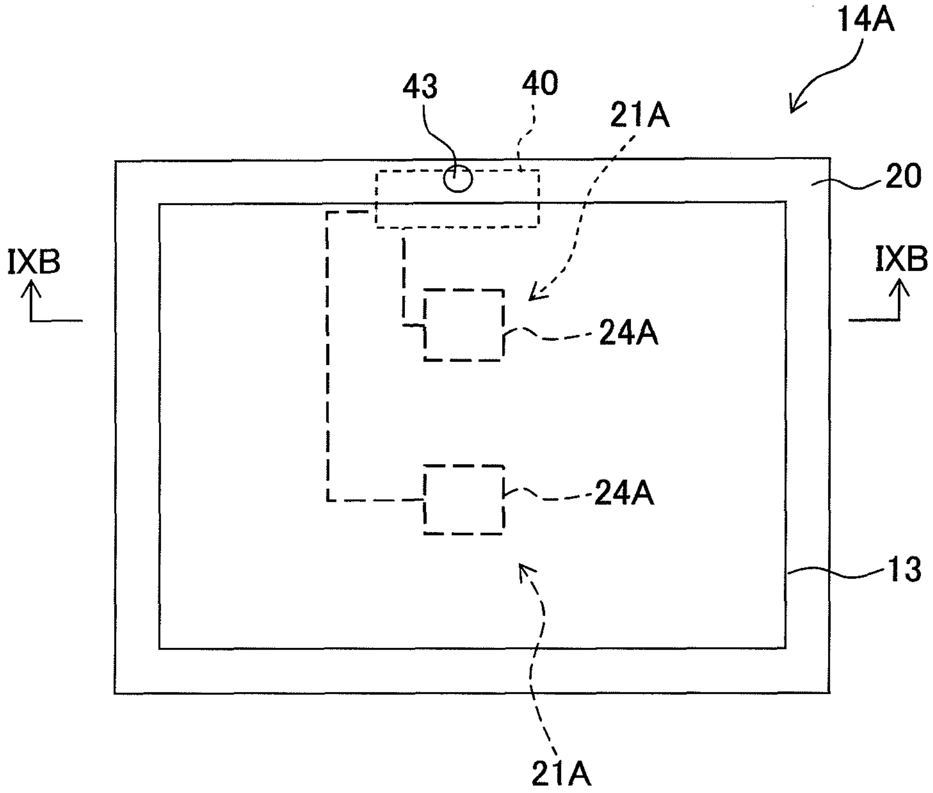
FIG. 9A is a plane view of an image display device in another modification.
Figure 9B:
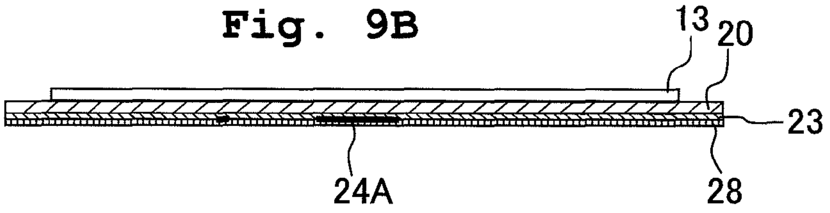
FIG. 9B is a cross-sectional view taken along IXB-IXB line in FIG. 9A.

Further, each of the bending detecting sensors may also include two types of electrodes disposed face to face on both surfaces of the piezoelectric layer 23 such that the electrodes sandwich the piezoelectric layer 23. For example, in an image display device 14A as shown in FIGS. 9A and 9B, a base member 20 is a thin plate made of a metallic material, and the base member 20 serves as a common electrode in contact with one surface of a piezoelectric layer 23. Further, on a surface (lower surface) of the piezoelectric layer 23 opposite to the base member 20, two electrodes 24A in a rectangular shape in a plane view, which face to the base member 20 served as the common electrode, are disposed. Then, a single bending detecting sensor 21A includes the single electrode 24A, the base member 20 as the common electrode, and the piezoelectric layer 23 sandwiched between the both electrodes in a thickness direction of the piezoelectric layer 23. Note that the base member 20 as the common electrode remains at the ground potential.

When a bending deformation is generated in the base member 20, a distortion is generated in a portion sandwiched between the electrode 24A disposed on the lower surface of the piezoelectric layer 23 and the base member 20 as the common electrode on the upper surface of the piezoelectric layer 23 in the above constitution. Then, a potential difference is generated between the electrode 24A and the base member 20, so that it makes it possible to detect the bending deformation of the base member 20.

Note that in an example in FIGS. 9A and 9B, the metallic base member 20 serves as the electrode facing to the electrode 24A across the piezoelectric layer 23, but the base member 20 is not necessary to serve as one of a pair of electrodes sandwiching the piezoelectric layer 23 in particular. In addition to the base member 20, an separate electrode may also be disposed on the surface, of the piezoelectric layer 23, facing the base member 20.

Further, the bending detecting sensor is not limited to the piezoelectric sensor in which the mechanical-electrical conversion operation of the piezoelectric element is used. For example, the bending detecting sensor may include an electrical resistor made of a conductive material disposed on the front surface of the base member 20 and whose electrical resistance changes in accordance with extension and contraction deformations of the base member 20, (which is, what is called a strain gauge). In this case, when the base member 20 is bended, the above electrical resistor provided on the front surface of the base member 20 extends and contracts. Therefore, the electrical resistance of the electrical resistor changes. Thus, a bending deformation of the base member 20 can be detected by the above change in the electrical resistance of the electrical resistor.

Alternatively, the bending detecting sensor may also be an acceleration sensor. In this case, at least two acceleration sensors are provided on the front surface (lower surface) of the base member 20 respectively. Then, based on a movement (displacement) of two positions of the base member 20 detected by the two acceleration sensors respectively, a bending deformation of the base member 20 can be detected.

Seventh Modification

The display 13 displaying an image thereon is not always necessary to be provided on the base member 20 integrally.

Figure 10:
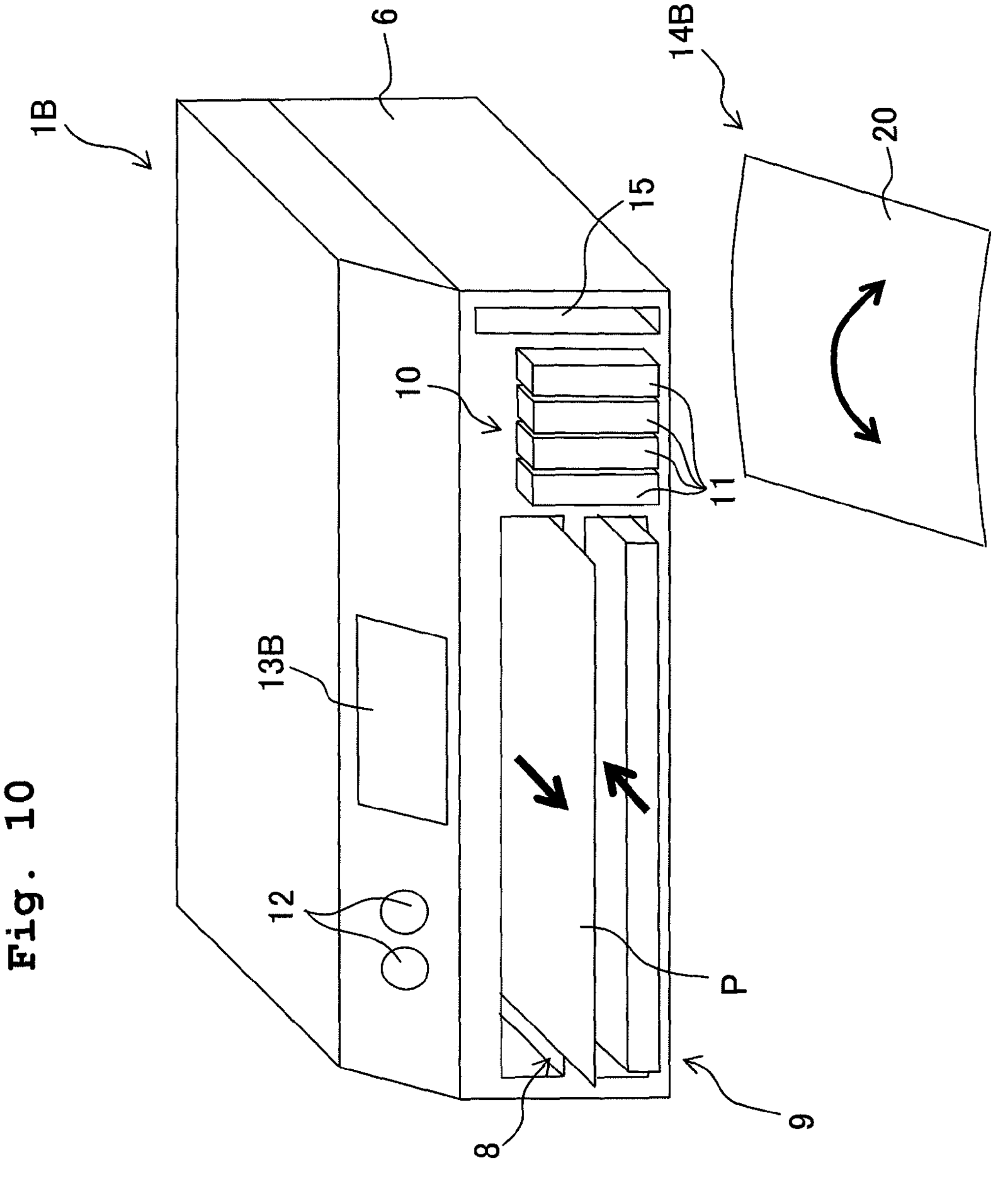
FIG. 10 is a perspective view of a printer according to still another modification.
Figure 11:
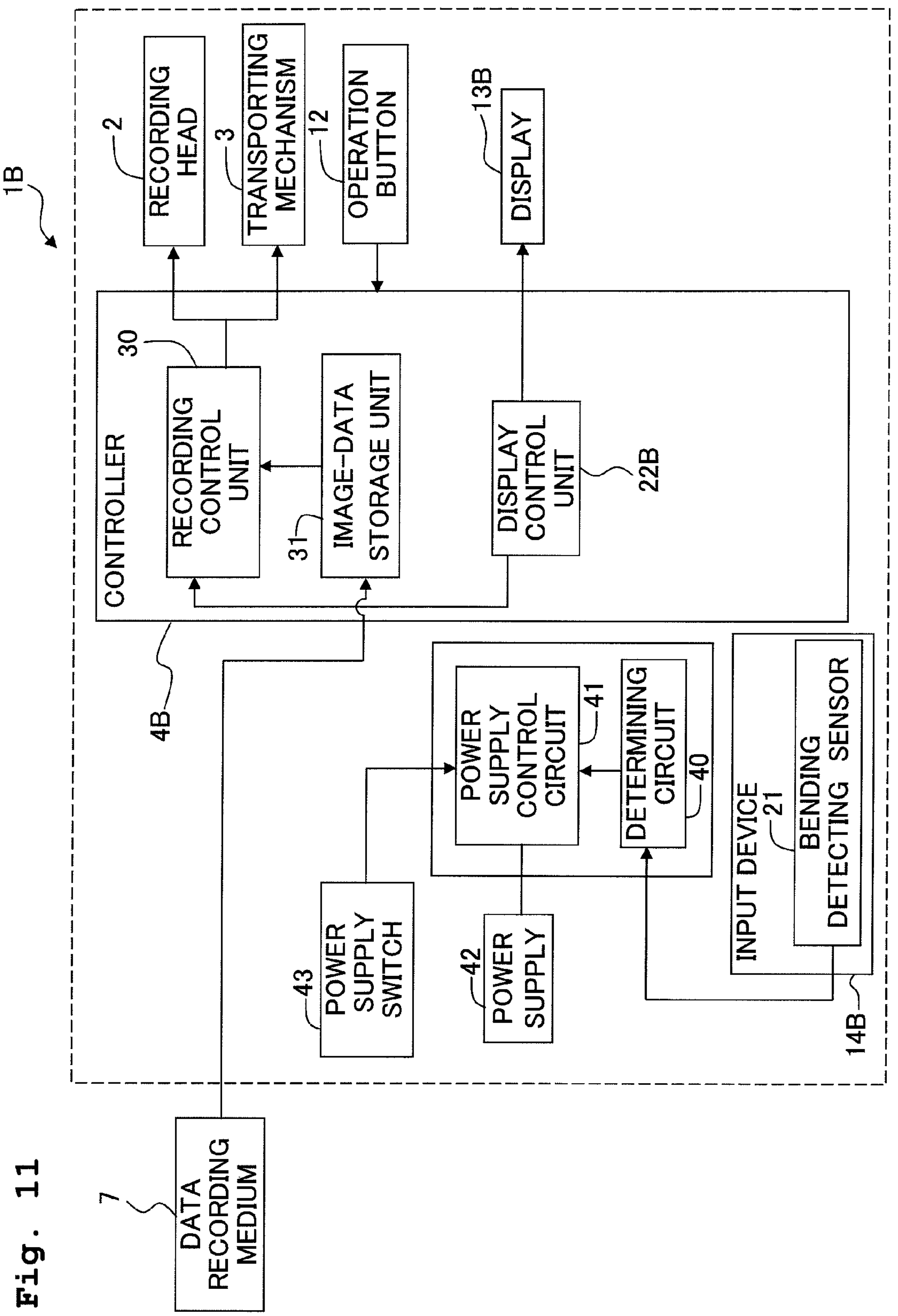
FIG. 11 is a block diagram schematically showing a control system of the printer in FIG. 10.

That is, as is a printer 1B shown in FIGS. 10 and 11, an input device 14B including a sheet-shaped base member 20 is connected to a controller 4B in a body 6 so that they can communicate with each other, and a display 13B displaying an image thereon may also be provided on a body 6.

As shown in FIG. 11, in this modification, a display control unit 22B (display control mechanism) controlling the display 13B is provided in the controller 4B in the printer 1B. Further, a judging circuit 40 determining or judging bending deformations of the base member 20 in the input device 14B and a power supply control circuit 41 controlling a power supply 42 in the printer 1B are provided separately from the input device 14B.

Then, when the judging circuit 40 determines that the first bending deformation of the twofold or the like is generated in the base member 20 based on output signals of bending detecting sensors 21 in the input device 14B, the power supply control circuit 41 changes an operation mode of the printer 1B to a low power mode by turning the power supply 42 OFF or the like. Further, when the judging circuit 40 determines that the second bending deformation mode which is different from the first bending deformation mode is generated in the base member 20, the display control unit 22B changes an image to be displayed on the display 13B. Note that in this modification, the entire printer 1B provided with the display 13B and the input device 14B corresponds to the image display device of the present teaching.

When the display 13B is provided separately from the base member 20 in the input device 14B as described above, a constitution of the input device 14B is simplified. Further, there is no need to constitute the display 13B as the flexible display 13 such as an electronic paper.

Note that the image display device 14 in the above-described embodiment is used by being connected to the printer 1 provided with the recording head 2. However, an image display device provided with a display may also be usable even as the image display device itself without being connected to another apparatus such as a printer. In this case, a power supply control circuit controls a power supply included in the image display device itself to shift an operation mode of the image display device to a low power mode, when a judging circuit in the image display device determines that the above-described first bending deformation mode is generated in a base material. The power supply to be controlled may also be provided integrally with the base material in this manner, or it may also be provided separately from the base material as described above. For example, the power supply to be controlled may also be a power supply for a display provided integrally with a base material, or it may also be a power supply for a printer provided separately from a base material or the like.

In the above-described embodiment and modifications, the image display device including the base material having flexibility formed integrally with the display, and the printer connected to the input device including the base material having flexibility and provided with the display displaying an image thereon are explained as examples, but the present teaching is not limited to them, and the display is not always necessary to be provided. For example, the present teaching is applied to a portable audio player formed integrally with a base material having flexibility, and an operation mode of the audio player may also be shifted to a low power mode when a judging circuit judges that the above-described first bending deformation mode is generated in the base material. As described above, regardless of whether or not a display is provided, the present teaching can be applied to an electronic apparatus formed integrally with a base material having flexibility. Further, a display is not always necessary to be provided on a printer connected to an input device including a base material having flexibility as well. Furthermore, an apparatus connected to the above-described input device is not always limited to the image recording apparatus such as the printer, but it may also be a general electronic apparatus. In the case when the above-described input device is connected to a refrigerator, for example, when a judging circuit provided in a body of the refrigerator or in an input device determines that the above-described first bending deformation mode is generated in a base material, a power supply control circuit may also shift an operation mode of the refrigerator to a low power mode by controlling a power supply of the refrigerator. At this time, a display displaying what is in the refrigerator thereon may also be provided on the input device. When a user uses the display on the input device, there is a possibility that the user opens the door of the refrigerator, and thus the refrigerator is operated by not the low power mode but a mode (a normal mode or a high performance mode) in preparation for the door opening. On the other hand, when the judging circuit determines that the above-described first bending deformation mode is generated in the base material by the input device being folded or the like, the possibility that a user opens the refrigerator door is regarded as low, and thus the operation of the refrigerator is switched to the low power mode. Further, as another example of an electronic apparatus connected to the input device, a scanner is cited. In this case, when a judging circuit determines that the above-described first bending deformation mode is generated in a base material by the input device being folded or the like, the scanner is switched to a low power mode by turning off a lamp or the like.

What is claimed is:

1. An electronic apparatus which operates in a plurality of operation modes, comprising:

an input mechanism including:

a sheet-shaped base member which has a flexibility and is arranged to spread in a plane direction;

a bending detector which is disposed on a front surface of the base member and which detects an elastic bending deformation generated in the base member; and a display portion provided integrally with the sheet-shaped base member, having flexibility, and displaying an image thereon;

a body which is provided separately from the input mechanism, such that the body is not physically connected to the input mechanism;

a power supply device which supplies a power, the power supply device being disposed in the body;

a bending deformation judging mechanism which judges whether or not a first bending deformation mode is generated in the base member based on a detection result of the bending detector;

a controller which controls an operation of the electronic apparatus; and a mode changing mechanism which changes an operation mode of both the power supply device and the display portion from a normal mode to a low power mode under a condition that the bending deformation determining mechanism judges that the first bending deformation mode is generated in the base member, the normal mode being an operation mode in which the electronic apparatus operates with a power consumption, and the low power mode being an operation mode in which the electronic apparatus operates with a low power consumption lower than the power consumption;

wherein the controller controls the display portion; and wherein, in the normal mode, the controller controls the display portion to display an image.

2. The electronic apparatus according to claim 1;

wherein the first bending deformation mode includes folding the base member so that an area in the plane direction of the base member becomes small.

3. The electronic apparatus according to claim 1;

wherein the input mechanism is formed integrally with a power supply device, the bending deformation judging mechanism, the controller, and the mode changing mechanism.

4. The electronic apparatus according to claim 1;

wherein the bending detector includes a plurality of bending detectors which detect bending deformations in a plurality of regions of the base member, respectively.

5. The electronic apparatus according to claim 4;

wherein the bending deformation judging mechanism judges whether a bending deformation generated in the base member is the first bending deformation mode or a second bending deformation mode which is different from the first bending deformation mode, based on detection results of the bending detectors.

6. The electronic apparatus according to claim 5;

wherein the display portion changes an image to be displayed on the display portion under a condition that the bending deformation judging mechanisms judges that the second bending deformation mode is generated in the base member.

7. The electronic apparatus according to claim 4;

wherein the bending detectors are disposed side by side in one direction parallel to the plane direction of the base member; and wherein under a condition that the bending detectors detect elastic bending deformations in the regions sequentially in the one direction, the bending deformation judging mechanism judges that a mode, as the first bending deformation mode, in which the base member is rolled in the one direction is generated in the base member.

8. The electronic apparatus according to claim 7;

wherein the base member has a rectangular shape with two long-sides; and wherein the predetermined regions are positioned side by side in a direction parallel to the long-sides of the base member.

9. The electronic apparatus according to claim 1;

wherein the bending detector is constructed to detect a bending deformation of the base member in a region positioned on a straight line passing a center of the front surface of the base member; and wherein, under a condition that the bending detector detects an elastic bending deformation of the base member in the region, the bending deformation judging mechanism judges that a mode, as the first bending deformation mode, in which the base member is folded in two along the straight line is generated in the base member.

10. The electronic apparatus according to claim 9;

wherein the base material has a rectangular shape with two long-sides; and wherein the predetermined region is positioned on a straight line connecting midpoints of the two long-sides of the base member.

11. The electronic apparatus according to claim 1;

wherein the lower power mode includes a power supply OFF mode turning the power supply device OFF.

12. The electronic apparatus according to claim 1;

wherein under a condition that in the low power mode, the bending deformation judging mechanism judges that an elastic bending deformation in a direction opposite to that in the first bending deformation mode is generated in the base member, the mode changing mechanism changes the operation mode from the low power mode to the normal mode.

13. The electronic apparatus according to claim 1, further comprising a display section provided on the body and displaying an image thereon;

wherein the controller controls the display section; and wherein, in the normal mode, the controller controls the display section to display an image.

14. The electronic apparatus according to claim 1, further comprising:

a body in which the power supply device is disposed;

an image recording section provided in the body and recording an image on a recording medium; and a display displaying an image thereon;

wherein the controller controls the image recording section and the display; and wherein, in the normal mode, the controller controls the display to display an image, and controls the image recording unit to record the displayed image onto the recording medium.

15. The electronic apparatus according to claim 14;

wherein the display is provided integrally with the sheet-shaped base member and having flexibility.

16. The electronic apparatus according to claim 1;

wherein a housing unit in which the input mechanism is housed is provided in the body; and wherein the first bending deformation mode is a bending deformation mode in which the input mechanism is bended to be housed into the housing unit.

17. The electronic apparatus according to claim 16;

wherein the electric apparatus is a printer which is configured to print an image on a sheet;

wherein the printer includes a discharge tray on which the sheet printed with an image thereon is discharged; and wherein the housing unit and the discharge tray are arranged on one surface of the body.

18. The electronic apparatus according to claim 17;

wherein the discharge tray is configured to be elongated in an extending direction; and wherein the housing unit and the discharge tray are arranged, side by side, along the extending direction.

* * * * *